(12) United States Patent
Large

(10) Patent No.: US 8,358,901 B2
(45) Date of Patent: Jan. 22, 2013

(54) OPTIC HAVING A CLADDING

(75) Inventor: Timothy Andrew Large, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 864 days.

(21) Appl. No.: 12/474,014

(22) Filed: May 28, 2009

(65) Prior Publication Data

US 2010/0302209 A1 Dec. 2, 2010

(51) Int. Cl.
*G02B 6/10* (2006.01)
*G06F 3/042* (2006.01)

(52) U.S. Cl. .......... 385/146; 345/176
(58) Field of Classification Search ........ None
See application file for complete search history.

(56) References Cited

U.S. PATENT DOCUMENTS

| | | | |
|---|---|---|---|
| 5,214,536 A | 5/1993 | Prakash | |
| 5,369,718 A | 11/1994 | Kamata et al. | |
| 5,838,854 A * | 11/1998 | Taneya et al. | 385/50 |
| 6,011,641 A | 1/2000 | Shin et al. | |
| 6,449,066 B1 | 9/2002 | Arns et al. | |
| 6,542,687 B2 | 4/2003 | Won et al. | |
| 7,040,774 B2 | 5/2006 | Beeson et al. | |
| 7,352,939 B2 | 4/2008 | Ramachandran | |
| 7,474,447 B2 | 1/2009 | Horimai | |
| 7,916,991 B2 | 3/2011 | Kumkar et al. | |
| 8,013,845 B2 * | 9/2011 | Ostergaard et al. | 345/176 |
| 2002/0080493 A1 | 6/2002 | Tsai et al. | |
| 2002/0154879 A1 * | 10/2002 | Yasuda et al. | 385/132 |
| 2004/0165266 A1 | 8/2004 | Galstian et al. | |
| 2008/0007541 A1 * | 1/2008 | Eliasson et al. | 345/176 |
| 2008/0088603 A1 * | 4/2008 | Eliasson et al. | 345/176 |
| 2008/0128720 A1 | 6/2008 | Cho et al. | |
| 2008/0150915 A1 * | 6/2008 | Shibue et al. | 345/176 |
| 2008/0284925 A1 | 11/2008 | Han | |
| 2010/0110340 A1 | 5/2010 | Mather et al. | |
| 2010/0302209 A1 | 12/2010 | Large | |
| 2011/0122095 A1 * | 5/2011 | Tsai et al. | 345/175 |
| 2011/0228562 A1 * | 9/2011 | Travis et al. | 362/628 |
| 2011/0273906 A1 * | 11/2011 | Nichol et al. | 362/607 |

OTHER PUBLICATIONS

"Perfect Mirror", Retrieved at<<http://en.wikipedia.org/wiki/Perfect_mirror>>, p. 1.

(Continued)

*Primary Examiner* — Uyen-Chau N Le
*Assistant Examiner* — Chris Chu
(74) *Attorney, Agent, or Firm* — Alleman Hall McCoy Russell & Tuttle LLP

(57) ABSTRACT

Various embodiments of wedge-shaped light guide optics are disclosed. One embodiment comprises a wedge-shaped light guide having opposing first and second faces and includes a material having a first refractive index. The first face of the wedge-shaped light guide supports a cladding layer having a second refractive index less than the first refractive index. The optic further comprises a turning film bonded to the cladding layer via an interface layer. The interface layer has a third refractive index matched to the first refractive index.

19 Claims, 11 Drawing Sheets

OTHER PUBLICATIONS

Lim, et al., "Fluorescent Liquid-Core/Air-Cladding Waveguides Towards Integrated Optofluidic Light Sources", Retrieved at <<http://msfl.kaist.ac.kr/sub/paper/international/120.pdf>>, Conference Title: Nanoengineering: Fabrication, Properties, Optics, and Devices V, 2008, pp. 1580-1585.

Stankovic, et al., "Silicon Photonic Waveguides for Near-and Mid-Infrared Regions", Retrieved at <<http://przyrbwn.icm.edu.pl/APP/PDF/112/a112z547.pdf>>, Acta Physica Polonica A, Proceeding of the International School and Conference on Optics and Optical Materials, vol. 112, No. 5, Sep. 3-7, 2007, pp. 1019-1024.

"Fiber Optics Could Provide New Options for Photovoltaics", Retrieved at <<http://www.alternative-energy-news.info/fiber-optics-photovoltaics/>>, Retrieved Date: Apr. 25, 2011, pp. 9.

Joannopoulos, J.D., "Manipulating Light with Photonic Crystals", Retrieved at <<http://lib.semi.ac.cn:8080/tsh/dzzy/wsqk/SPIE/vol4253/4253-1.pdf>>, Physica B-condensed Matter—Physica B, vol. 394, No. 2, 2007, pp. 1-10.

* cited by examiner

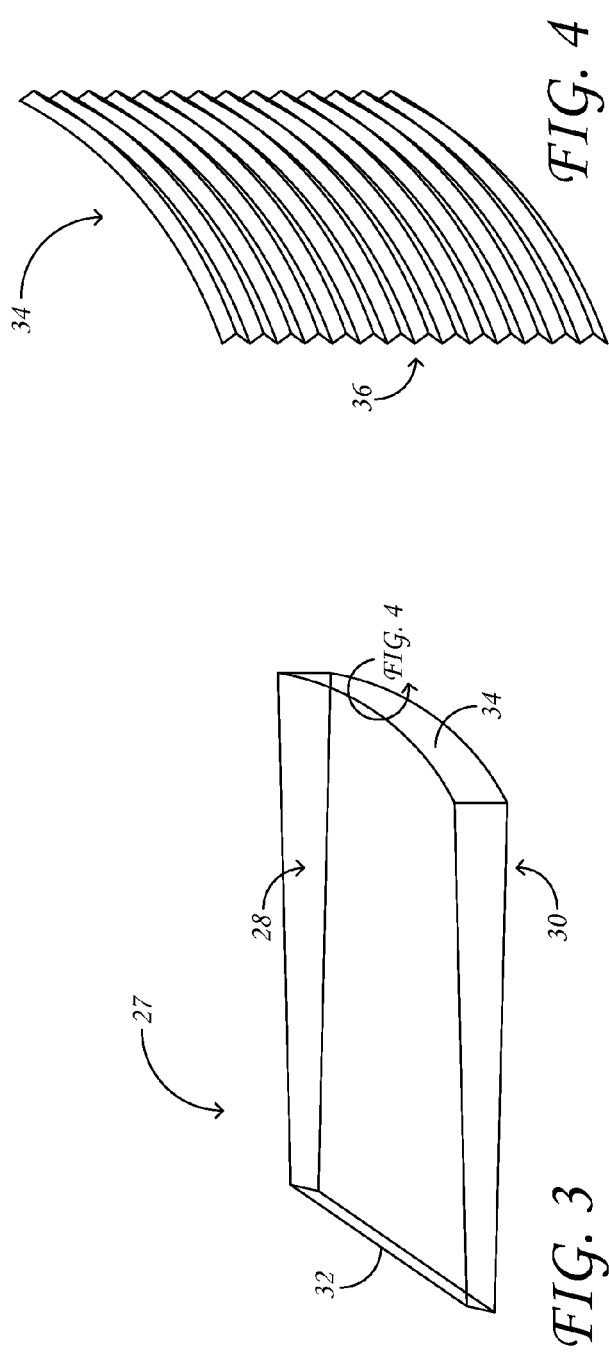
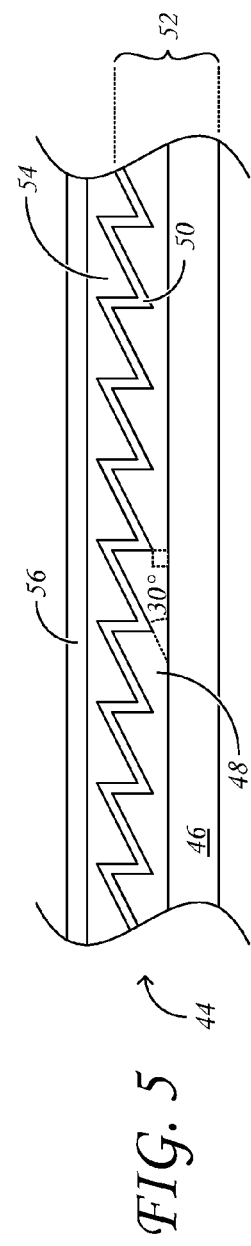

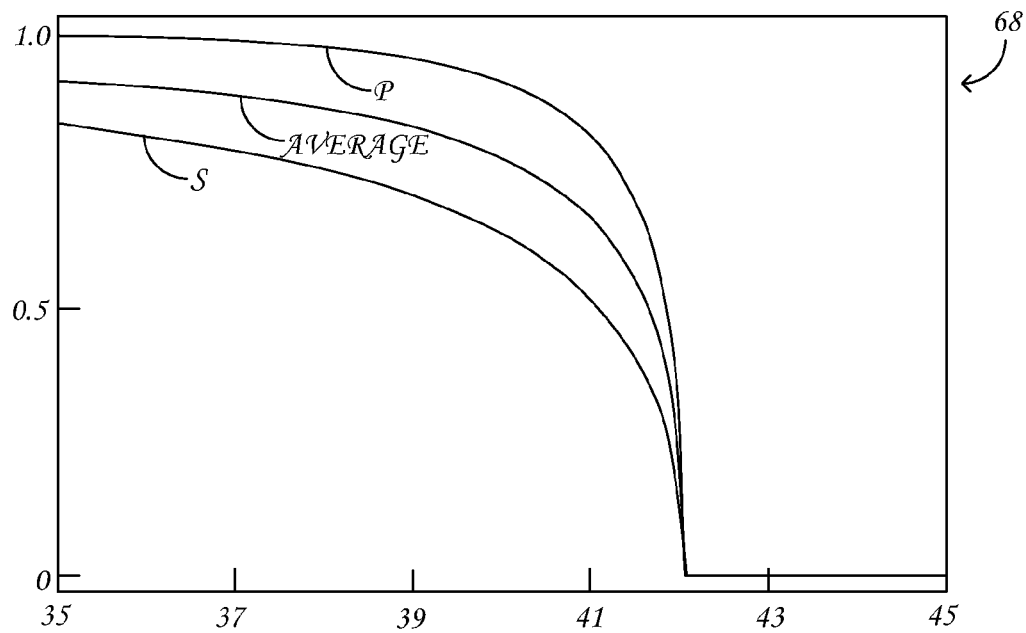
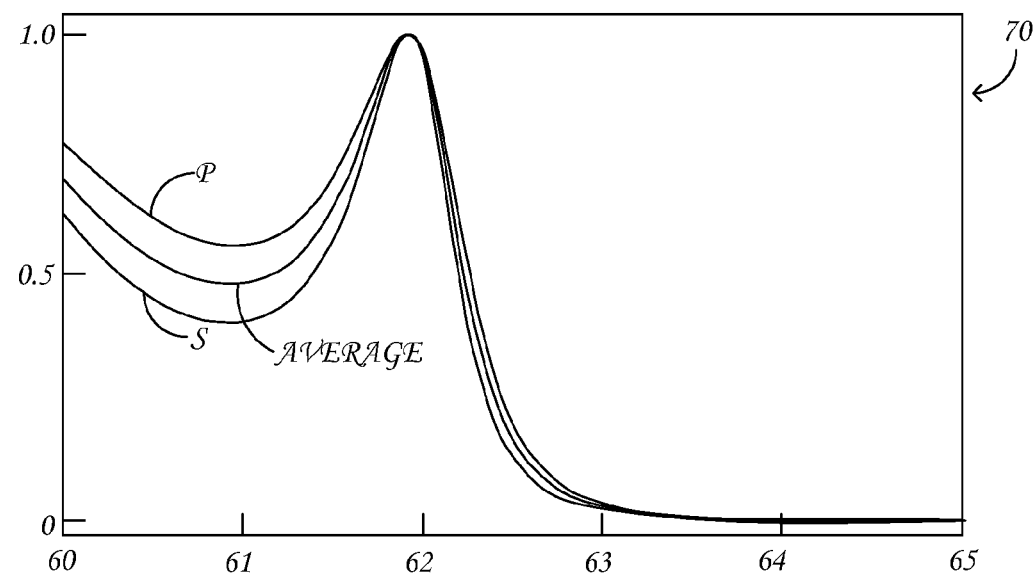
FIG. 10

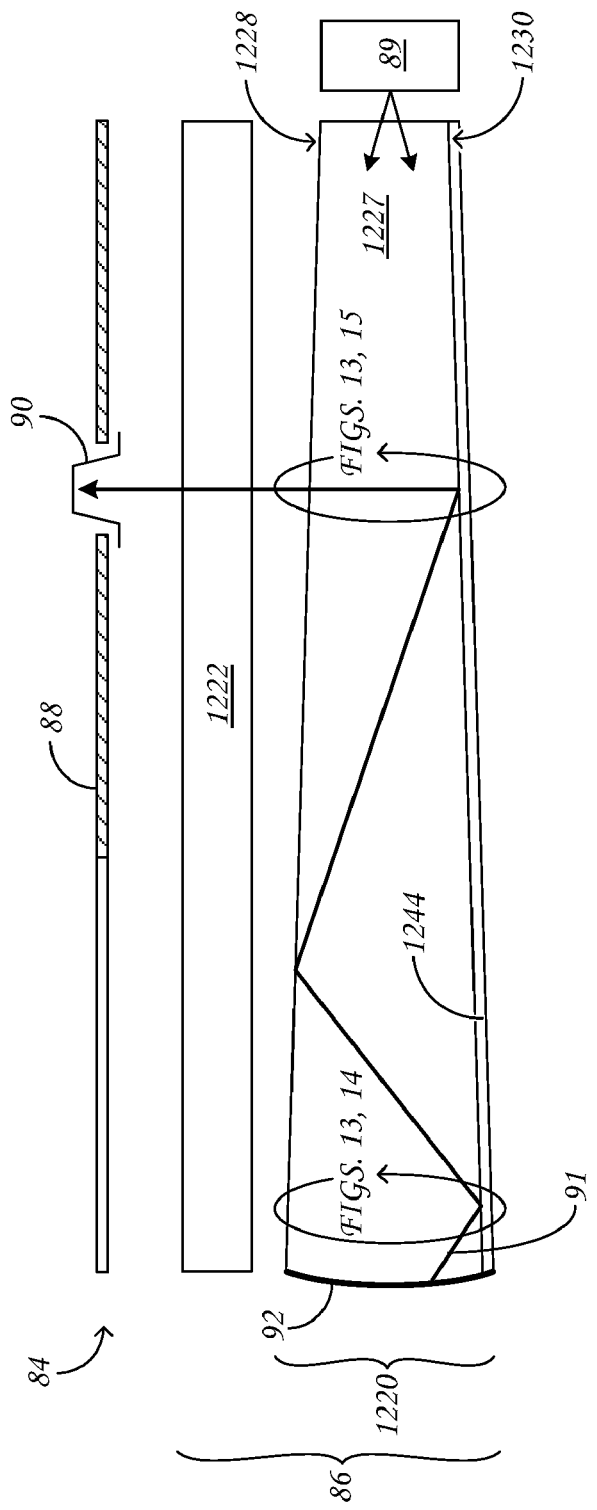
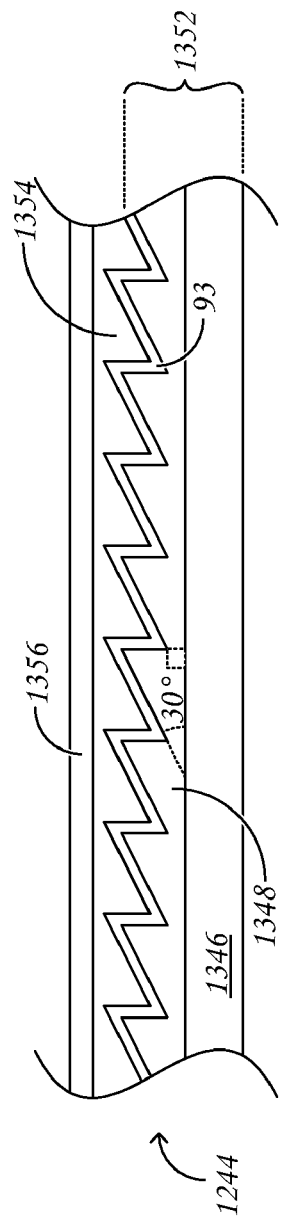
FIG. 12
FIG. 13

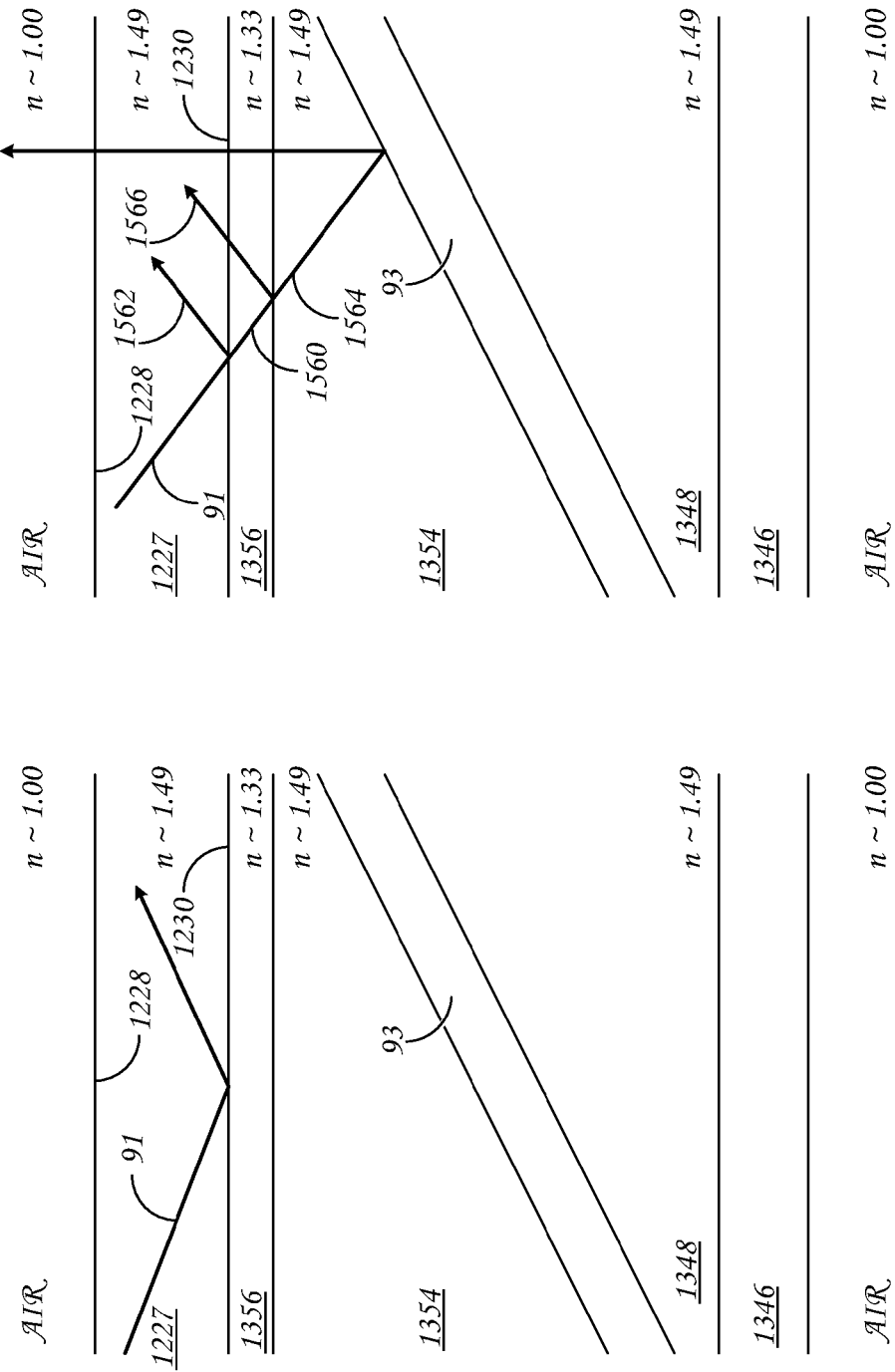

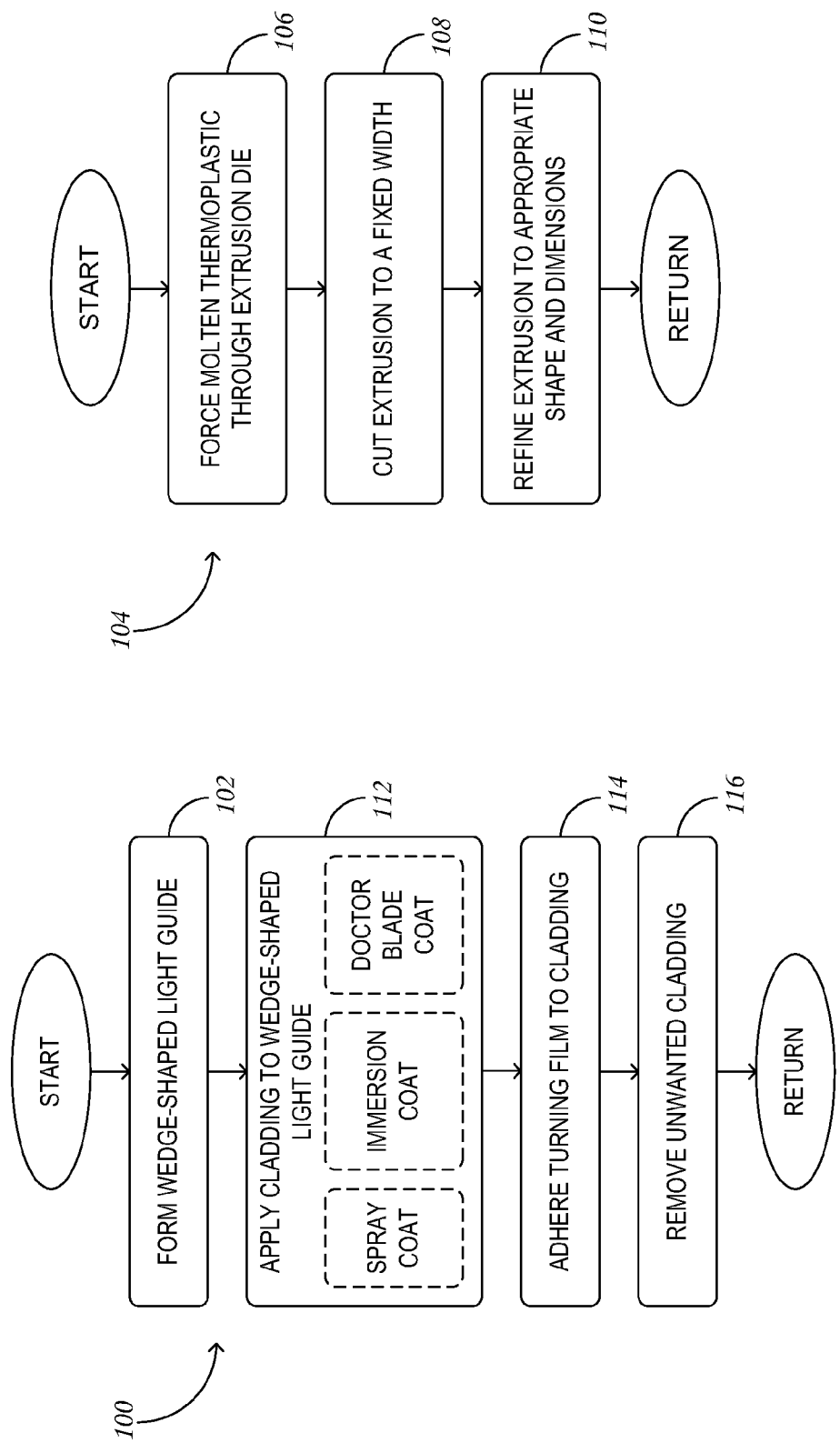

OPTIC HAVING A CLADDING

BACKGROUND

A computer system may include one or more optical systems that provide an image as output or receive an image as input. Example optical systems include displays, cameras, scanners, and certain kinds of touch-sensitive input systems. Some optical systems may include a light guide that transmits an image to a touch-sensitive display surface, focuses an image on a detector, or does both. The light guide may be wedge-shaped, transparent in one or more visible and/or infrared wavelength ranges, and comprise at least one pair of opposing faces. Through the light guide, light of a certain wavelength range may propagate laterally, via internal reflection from the opposing faces. In many cases, the material properties and overall configuration of the light guide may affect the intensity and fidelity of the images provided by the optical system.

SUMMARY

Therefore, in one embodiment, an optic is provided. The optic comprises a wedge-shaped light guide having opposing first and second faces and comprising a material having a first refractive index. The first face of the wedge-shaped light guide supports a cladding layer having a second refractive index less than the first refractive index. The optic further comprises a turning film bonded to the cladding layer via an interface layer. In this embodiment, the interface layer has a third refractive index matched to the first refractive index.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

FIGS. 3 and 4 show aspects of an example wedge-shaped light guide in one embodiment in accordance with the present disclosure.

FIG. 5 shows a multilayer turning structure in one embodiment in accordance with the present disclosure.

FIG. 10 shows graphs of transmission efficiency versus incidence angle for selected interfaces in example embodiments in accordance with the present disclosure.

FIG. 12 is a schematic, cross-sectional view showing aspects of an optical system and an input zone of an input device in one embodiment in accordance with the present disclosure.

FIG. 13 shows another multilayer turning structure in one embodiment in accordance with the present disclosure.

FIGS. 14 and 15 show ray diagrams in which light interacts with a display optic in accordance with one embodiment of the present disclosure.

FIG. 18 illustrates an example method for making an imaging or display optic in one embodiment in accordance with the present disclosure.

FIG. 19 illustrates an example method for making an imaging or display optic in one embodiment in accordance with the present disclosure.

DETAILED DESCRIPTION

The subject matter of the present disclosure is now described by way of example and with reference to certain illustrated embodiments. Components that may be substantially similar in two or more embodiments are identified coordinately and are described with minimal repetition. It will be noted, however, that components identified coordinately in different embodiments of the present disclosure may be at least partly different. It will be further noted that the drawings included in this disclosure are schematic. Views of the illustrated embodiments are generally not drawn to scale, and the aspect ratio of some drawings may be purposely distorted to make selected features or relationships easier to see.

Figure 1:
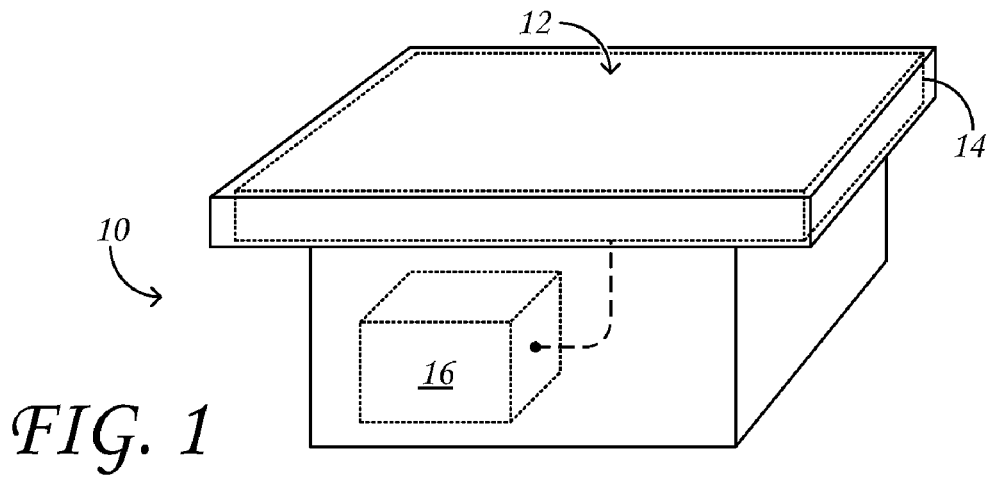
FIG. 1 shows aspects of an example computer system in one embodiment in accordance with the present disclosure.

FIG. 1 shows aspects of an example computer system 10 in one embodiment. The computer system includes a large-format, touch-sensitive display surface 12. Optical system 14, located below the touch-sensitive display surface, may be configured to provide both display and input functionality for the computer system. Accordingly, FIG. 1 shows controller 16 operatively coupled to the optical system. The controller may be any device configured to provide display data to and receive input data from the optical system. In some embodiments, the controller may comprise all or part of a computer; in other embodiments, the controller may be any device operatively coupled to a computer via a wired or wireless communications link.

To provide display functionality, optical system 14 may be configured to project a visible image onto the touch-sensitive display surface. To provide input functionality, the optical system may be configured to capture at least a partial image of objects placed on the touch-sensitive display surface-fingers, electronic devices, paper cards, food, or beverages, for example. Accordingly, the optical system may be configured to illuminate such objects and to detect the light reflected from the objects. In this manner, the optical system may register the position, footprint, and other properties of any suitable object placed on the touch-sensitive display surface.

Figure 2:
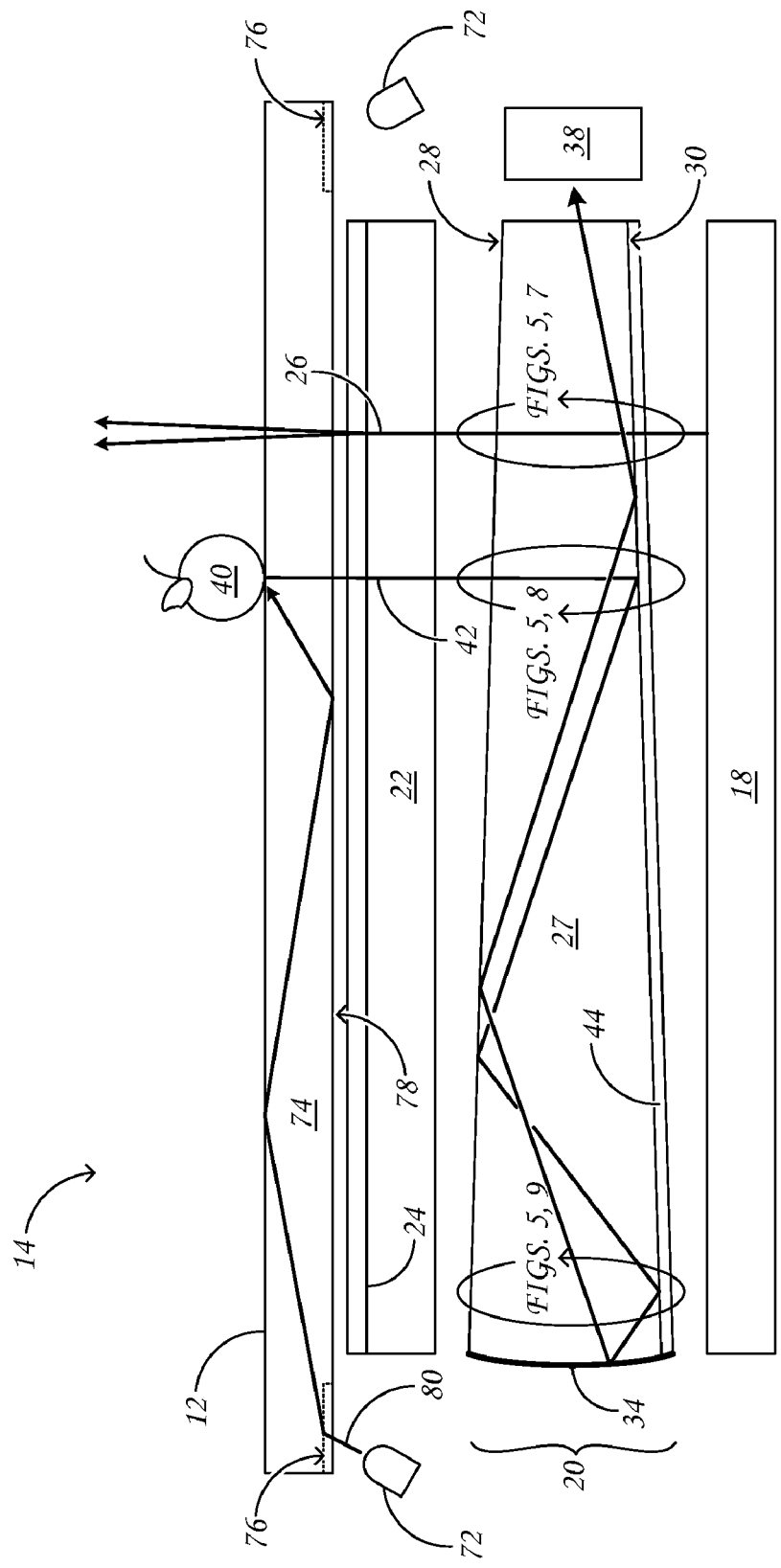
FIG. 2 is a schematic, cross-sectional view showing aspects of optical system 14 in one embodiment in accordance with the present disclosure.

FIG. 2 is a schematic, cross-sectional view showing aspects of optical system 14 in one embodiment. The optical system includes backlight 18, imaging optic 20, light valve 22, and diffuser 24. The backlight and light valve may be operatively coupled to controller 16 and configured to provide a visual display image to touch-sensitive display surface 12.

Backlight 18 may be any illuminant configured to emit visible light. Light from the backlight (light ray 26, for example) is projected through imaging optic 20 and is modulated with respect to color and intensity by numerous light-gating elements of light valve 22. In some embodiments, the light valve may comprise a liquid-crystal display device, but other light-modulating devices may be used as well. In this manner, the backlight and the light valve may together create a display image. The display image is projected through diffuser 24 and is thereby provided to touch-sensitive display surface 12. To ensure adequate display-image intensity, the imaging optic and the diffuser may be configured to transmit a substantial portion of the visible light incident upon them, at least in a direction normal to the touch-sensitive display surface, from which direction the display image would typically be viewed.

In the embodiment shown in FIG. 2, imaging optic 20 comprises wedge-shaped light guide 27 having an upper face 28 and a lower face 30. FIG. 3 illustrates one example wedge-shaped light guide in greater detail. It will be understood, however, that no aspect of FIG. 3 is intended to be limiting, because numerous wedge-shaped light guide variants are contemplated.

Referring now to FIG. 3, the opposing upper and lower faces of the wedge-shaped light guide may, in some embodiments, be substantially planar and nearly parallel, but offset from each other by a wedge angle of 1° or less. In one specific embodiment, the wedge angle may be 0.72 degrees, for example. As used herein, a 'substantially planar' surface is one that broadly conforms to a plane when surface roughness and manufacturing anomalies are not considered. For example, in one specific embodiment, a substantially planar surface may have a roughness of 3 nanometers (roughness average) or less. The wedge-shaped light guide may be oriented symmetrically with respect to the horizontal and/or any plane parallel to touch-sensitive display surface 12. Therefore, the angle of intersection between the upper or lower face of the light guide and any plane parallel to the touch-sensitive display surface may be one-half the wedge angle. Accordingly, the phrases 'normal to the wedge-shaped light guide,' 'normal to the imaging optic,' and 'normal to the opposing faces,' etc., are used herein to indicate an orientation substantially normal to the touch-sensitive display surface.

Wedge-shaped light guide 27 has a thinner side 32, and a thicker side 34 opposite the thinner side. In the example illustrated in FIG. 3, the wedge-shaped light guide is milled on the thicker side to define a section of a sphere enclosed by an acute central angle. The radius of curvature of the section so defined may be determined based on the detailed configuration of optical system 14, in which the wedge-shaped light guide is to be installed. In one particular embodiment, the thicker side is approximately twice the thickness of the thinner side, and the radius of curvature of the thicker side is approximately twice the length of the wedge-shaped light guide. In some embodiments, one or more sides of the wedge-shaped light guide (e.g., thinner side 32 or thicker side 34) may function as a lens, wherein the radius of curvature defines a focal length of the lens.

A more detailed sectional view of thicker side 34 in one, non-limiting embodiment is shown in FIG. 4. The drawing shows an array of substantially planar facets 36 running horizontally along the thicker side of the wedge-shaped light guide. The facets define a series of horizontal ridges that extend to meet the upper and lower edges of the thicker side. The facets may be coated with a reflective material to form an interleaved reflector on the thicker side. The interleaved reflector so formed may serve various functions in the optical system in which the light guide is to be installed—directing an image from a projector or onto a detector, for example. In one, non-limiting example, twenty-seven facets may be formed in the thicker side of the wedge-shaped light guide, forming a series of horizontal ridges spaced about 840 microns apart and extending about 80 microns from an upper or lower edge of the thicker side. In other examples, the thicker side of the wedge-shaped light guide may have any other suitable shape or profile. Based on a wedge-shaped light guide as described herein, imaging optic 20 may be configured to transmit light laterally between the opposing first and second faces at least partly via total internal reflection from a boundary of the wedge-shaped light guide. It will be understood, of course, that the details of the configuration described here and in FIG. 3 are presented for the purpose of example, and are not intended to be limiting in any manner.

Returning now to FIG. 2, optical system 14 may be further configured to provide input functionality to computer system 10. Accordingly, the illustrated optical system includes detector 38. The detector may be a camera—an infrared-sensitive, digital camera, for example. Imaging optic 20 may be configured to direct onto the detector light from one or more objects arranged on or contacting touch-sensitive display surface 12. Such light may originate from various sources, as described hereinafter. Accordingly, the detector may capture at least a partial image of the one or more objects.

FIG. 2 shows object 40 in contact with touch-sensitive display surface 12, and light ray 42 propagating away from the object. The illustrated light ray is shown passing through various components of optical system 14 and into imaging optic 20. To image light from the touch-sensitive display surface onto detector 38, the imaging optic may be configured to turn the light towards the reflective thicker end of the wedge-shaped light guide and to confine the turned light en route to the detector via total internal reflection. Accordingly, lower face 30 of the imaging optic comprises multilayer turning structure 44. The present disclosure embraces numerous variants of the multilayer turning structure. For example, the multilayer turning structure may be reflective, so that light is directed back through wedge-shaped light guide 27.

FIG. 5 shows a more detailed view of multilayer turning structure 44 in one embodiment. The multilayer turning structure includes base layer 46. In some embodiments, the base layer may be a 300 micron-thick layer of polyethylene tetraphthalate (PET), for example. In other embodiments, the base layer may comprise any other suitable material at any suitable thickness. On top of the base layer is disposed a patterned layer 48 having a regular prismatic structure in which one face of each prism is orthogonal to the base layer, and an adjacent face is oriented oblique to the base layer. The adjacent face oriented oblique to the base layer may be oriented between 15 and 45 degrees from the base layer—28 degrees, for example. The patterned layer may comprise an acrylic copolymer, for example, among various other suitable materials. In one embodiment, base layer 46 and patterned layer 48 may be provided in the form of a commercially prefabricated, multilayer film. For example, an image-directing film (IDF) manufactured by 3M Corporation of Saint Paul, Minn. is one example of a suitably configured, two-layer film that may be used for the base layer and the patterned layer. On top of the patterned layer, a reflective or partly reflective coating may be disposed. In the embodiment illustrated in FIG. 5, the reflective or partly reflective coating comprises dichroic coating 50.

Dichroic coating 50 may comprise a plurality of very thin dielectric layers applied to patterned layer 48 in any suitable manner. In one embodiment, the dichroic coating may be applied via evaporation or sputtering of various inorganic oxides or other materials onto the patterned layer, by chemical vapor deposition, or in any other suitable manner. In one embodiment, the thin dielectric layers may be quarter wave coatings of alternating high and low refractive indices—six to eight layers, for example.

Taken together, base layer 46, patterned layer 48, and dichroic coating 50 comprise turning film 52 in one example embodiment. In some examples, one or more constituents of the turning film may be chosen to have a coefficient of thermal expansion similar to that of the wedge-shaped light guide, such that nominal temperature variations do not cause the turning film to deform or separate from the wedge-shaped light guide. As described hereinafter, the turning film may be prepared separately and bonded to the remaining layers of the multilayer turning structure via an interface layer. Further, in some embodiments, the interface layer may comprise a layer of adhesive. Accordingly, in the embodiment illustrated in FIG. 5, adhesive layer 54 is disposed on the turning film. The adhesive layer may be a polyacrylic and/or ultraviolet-curable adhesive, for example, such as Dymax 3091 or Dymax 3099, available from the Dymax Corporation of Torrington, Conn. The adhesive layer serves to bond the turning film to cladding layer 56, which is described in further detail below. In other embodiments fully consistent with this disclosure, a prismatic patterned layer may be sealed in an encapsulant layer and then bonded to the wedge-shaped light guide using a transfer adhesive, such as Product 8154 of Adhesives Research, Inc., of Glen Rock, Pa. It will be understood that a dichroic coating may be included in some turning films and omitted in others. The dichroic coating may be omitted, for example, in embodiments where the imaging or display optic is not configured to separate visible light from infrared light, or does so in a different manner. In turning films that lack a dichroic coating, a broadband reflective coating may be substituted, as further described below.

Continuing in FIG. 5, cladding layer 56 comprises a thin layer of material. In some embodiments, the cladding layer may be applied as a coating on wedge-shaped light guide 27, as described hereinafter. The material or materials comprising the cladding layer may be chosen in view of certain physical properties. First, the cladding layer, at least in the thickness ranges set forth below, may be substantially non-absorbing and substantially non-scattering to light that imaging optic 20 is configured to transmit. Second, the cladding layer may be substantially resilient to expansion and compression strain, such that nominal temperature variations do not cause the cladding layer to crack or separate from the wedge-shaped light guide. Third, the cladding layer may have a lower refractive index than the material from which the wedge-shaped light guide is formed. For example, if the wedge-shaped light guide has a refractive index of 1.492, the cladding layer may have a refractive index in the range 1.1 to 1.4. Specific examples of materials that may be used for the cladding layer include, but are not limited to, silicone polymers (n~1.38) and fluoropolymers (n~1.33). Accordingly, in some specific embodiments, the cladding layer may comprise Teflon AF (EI DuPont de Nemours & Co. of Wilmington, Del.) Cytop (Asahi Corporation of Tokyo, Japan), MY-133 (MY Polymers Corporation of Rehovot, Israel), or LS-233 (Nusil Corporation of Carpinteria, Calif.), as examples. In other embodiments, the cladding layer may comprise a moth-eye layer, e.g., a layer of material having a refractive index typical of optical materials (e.g., acrylic, n~1.492), but incorporating an array of sub-wavelength features containing air. The result is a layer having a lower effective refractive index. Microporous materials such as aerogels and foams contain randomized pockets of air and can serve the same function, provided that the air pockets are substantially smaller than the wavelength of of interest. Fourth, the cladding layer may have a lower refractive index than the material from which the interface layer is formed—adhesive layer 54 in this example. Accordingly, the refractive index of the interface layer may, in some embodiments, be matched to that of the wedge-shaped light guide. As used herein, refractive indices are 'matched' if they differ by no more than ±2%. By virtue of the relative refractive indices of the cladding layer and the wedge-shaped light guide, the imaging optic may be configured to transmit light laterally between the opposing first and second faces of the wedge-shaped light guide at least partly via total internal reflection from a boundary of the cladding layer—lower face 30, in the illustrated embodiment.

Figure 7:
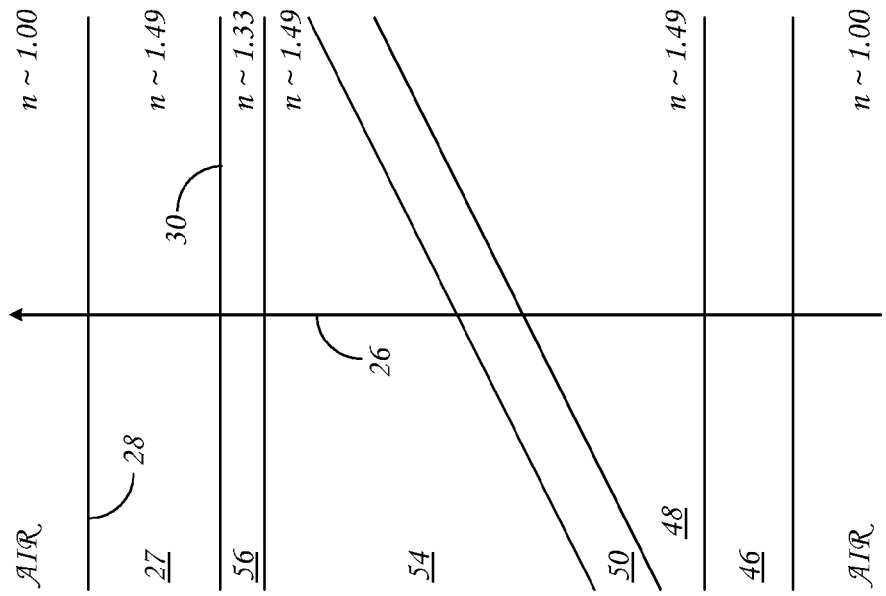
FIGS. 7, 8, and 9 show ray diagrams in which light interacts with an imaging optic in accordance with one embodiment of the present disclosure.
Figure 6:
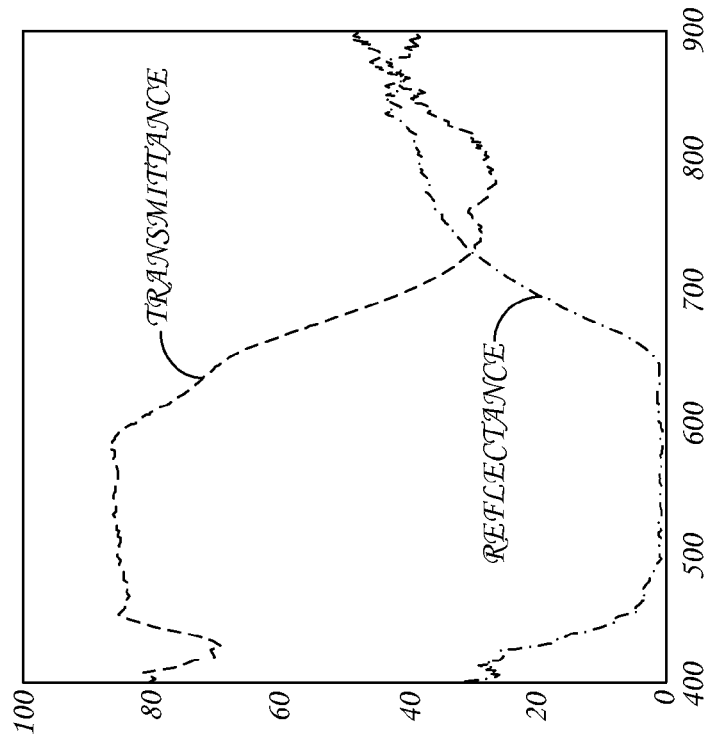
FIG. 6 shows transmission and reflection spectra of a dichroic coating applied to a polymethylmethacrylate light guide in accordance with one embodiment of the present disclosure.

Multilayer turning structure 44 is configured to interact minimally with the light passing through the imaging optic from backlight 18 (light ray 26, for example); interaction is averted because dichroic coating 50 is substantially transparent to visible light and because light projected from the backlight intersects the various interfaces of the multilayer turning structure at too small an angle (measured normal to the boundary) to undergo total internal reflection. FIG. 6 shows transmission and reflection spectra of the dichroic coating applied to the patterned side of an IDF film; percent transmittance/reflectance is plotted on the vertical axis, and wavelength in nanometers is plotted on the horizontal. The transmission spectrum (the dashed curve) reveals a relatively high transmittance in the visible wavelength range of roughly 450 to 700 nm. Further, the ray diagram of FIG. 7 illustrates that visible light intersecting the multilayer turning structure at a suitably low incidence angle (light ray 26, for instance) will pass directly through the structure.

In contrast, multilayer turning structure 44 may interact significantly with infrared light (light ray 42, for example) from the one or more objects disposed on touch-sensitive display surface 12. Stronger interaction with infrared light is a consequence of dichroic coating 50 being substantially reflective to infrared light, as shown by the reflectance spectrum (dot-dashed curve) in FIG. 6.

Figure 8:
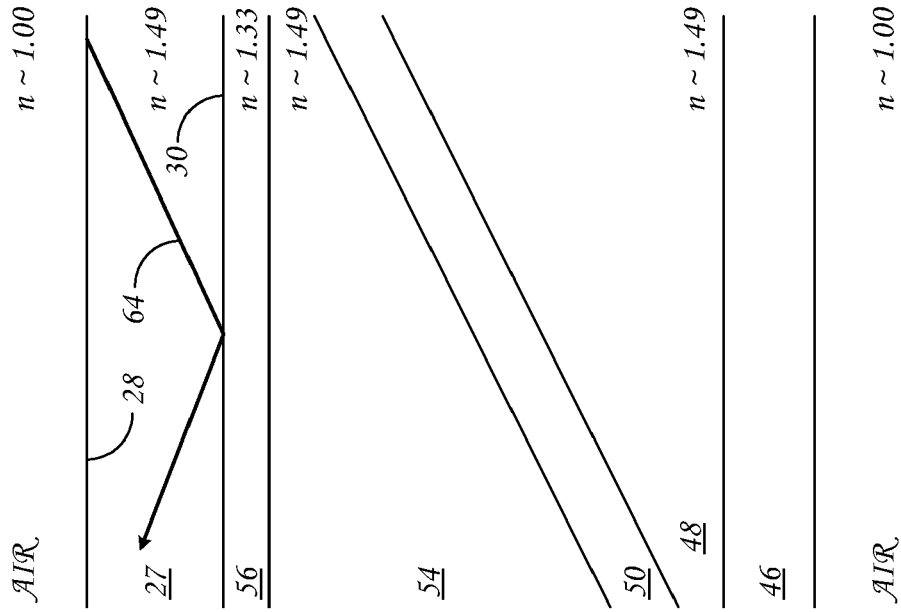

FIG. 8 shows light ray 42, for example, entering imaging optic 20 at an angle less than the Snell's Law critical angle for any boundary through which it passes. As a result, substantially all of the light is refracted through wedge-shaped light guide 27, cladding layer 56, and adhesive layer 54. Because dichroic coating 50 is reflective to infrared light, the light ray is turned towards detector 38. Thus, FIG. 8 shows turned light ray 58 incident upon cladding layer 56.

In order for any light from object 40 to be imaged on detector 38, the light must enter imaging optic 20 via refraction through one or more interfaces. At each boundary, however, reflection will also occur. Thus, FIG. 8 shows turned light ray 58 splitting into refracted light ray 60 and reflected light ray 62. Refracted light ray 60 is further split into forward light ray 64 and an interfering light ray 66. In the embodiment illustrated in FIG. 8, the equivalent refractive indices of adhesive layer 54 and wedge-shaped light guide 27 may help to provide that the intensity of interfering light ray 66 is nearly equal to that of reflected light ray 62. Further, the phase angle separating the two rays is determined by the thickness of cladding layer 56 and by the angle at which turned light ray 58 intersects the cladding layer. If the phase angle is $\pi M$, where M is any odd integer, then the two light rays interfere destructively, thereby eliminating the reflected power and maximizing the forward power. As described herein, the thickness of the cladding layer may be chosen to provide such a phase angle. In this manner, the imaging optic may be configured to attenuate a reflection of light which is incident on a boundary of the cladding layer at an angle less than a Snell's Law critical angle for the boundary (the angle measured normal to the boundary). In particular, to attenuate light having a median wavelength λ, the thickness d of the cladding layer may be selected so that the optical path through the cladding layer is approximately one-half of the median wavelength:

$$d \approx \lambda/[2\, n_2 \cos(\theta)], \quad \text{(equation 1)}$$

where $n_2$ is the refractive index of the cladding material, and θ is the propagation angle relative to the interface normal. In one example, if the propagation angle is 70 degrees, the wavelength 850 nm, and the refractive index of the cladding layer is 1.33, the thickness of the cladding layer may be 1.9 μm. In other examples, the thickness of the cladding layer may be any odd-integer multiple of the value d defined above: 3 d, 5 d, 7 d, for instance. Equation 1 is valid for any range of propagation angles below $\theta_c$, the Snell's Law critical angle for total internal reflection at the interface between the wedge-shaped light guide and the cladding layer, viz., $$\theta_c = \arcsin(n_2/n_1), \quad \text{(equation 2)}$$

where $n_1$ is the refractive index of the material of which the wedge-shaped light guide is made. However, for the purpose of selecting a suitable cladding layer thickness, the value of θ in equation 1 may be set to $\theta_c$. Thus, example cladding-layer thicknesses may include $$d \approx M\lambda/[2\, n_2 \cos(\theta_c)], \quad \text{(equation 3)}$$

where M is any odd integer. Therefore, in one, non-limiting embodiment, $$d \approx \frac{M\lambda}{2n_2\sqrt{1-(n_2/n_1)^2}} \quad \text{(equation 4)}$$

In these examples, the thickness tolerance may be ±10 percent or ±5 percent, for example.

Figure 9:
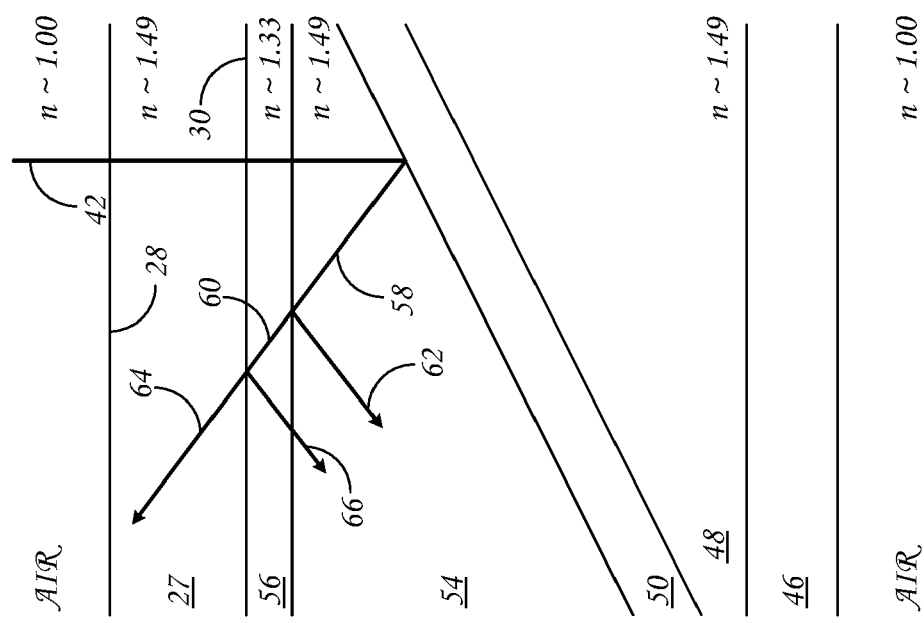

On penetrating wedge-shaped light guide 27, forward light ray 64 may reach upper face 28 at greater than the Snell's Law critical angle and be reflected back to lower face 30. At this point, shown in FIG. 9, the forward light ray may now intersect cladding layer 56 at greater than the critical angle and be internally reflected towards detector 38. After numerous internal reflections, light from object 40 may exit the imaging optic and be imaged by the detector.

To better appreciate some of the advantages of the illustrated embodiment, it is helpful to consider an otherwise similar configuration in which no cladding layer is disposed on wedge-shaped light guide 27. For instance, an air space could be disposed between the wedge-shaped light guide and a suitable turning structure. Such a configuration may enable the basic functionality described above, but may suffer at least three, interrelated problems. First, significant image intensity may be lost due to reflection as the light enters the wedge-shaped light guide from the turning structure. Such attenuation may decrease the signal-to-noise ratio for image detection. In particular, light from the turning structure, instead of undergoing the destructively interfering reflections described above, may undergo a single, intensity-stealing reflection at the lower boundary of the light guide. As a result, significant forward power may be lost, thereby reducing the intensity of the image provided to the detector. Second, the attenuation of the forward light ray may be sensitive to the polarization state of the incident light. This effect may result in undesirable variations in image intensity depending on the geometric and materials properties of the objects being imaged. Third, if the reflected light should somehow re-enter the light guide at a different location or incidence angle, the detector may register a ghost image superposed on the desired image.

Providing a cladding layer 56 of controlled thickness sandwiched between two higher-index regions addresses each of the deficiencies identified above. The advantages this structure feature provides are further underscored with reference to FIG. 10, which shows two graphs of transmissivity through a light guide boundary as a function of incidence angle. Upper graph 68 is for an unclad light guide (PMMA, n=1.49); lower graph 70 is for the same light guide clad with a ca. 3.5 wavelength-thick layer of Nusil LS2233 (n=1.33), and a layer of acrylic adhesive (n=1.49) disposed over the cladding layer. Transmissivity was probed using 550 nm light of S and P polarization states. It is clear from these graphs that the sandwiched cladding layer increases overall transmissivity by reducing reflectivity, and further reduces the polarization sensitivity of the transmissivity relative the unclad light guide boundary.

As noted above, light from one or more objects disposed on the touch-sensitive display surface may originate from various sources. In one embodiment, the light may be emitted by the objects. In the embodiment illustrated in FIG. 2, however, the light is provided by diffuse illumination of the objects, and reflected back through the touch-sensitive display surface. Thus, FIG. 2 shows infrared emitters 72—infrared light-emitting diodes, for example—and illuminating light guide 74. In the configuration illustrated in FIG. 2, the illuminating light guide is configured to illuminate the one or more objects from behind the touch-sensitive display surface. The illuminating light guide may be any optic configured to admit infrared light from one or more entry zones 76 and to project at least some of the infrared light from exit zone 78. The entry and exit zones of the illuminating optic may each comprise a turning film or other turning structure. In order to admit light from the infrared emitters and simultaneously provide the desired light-turning function, the turning structures associated with the entry zone and the exit zone may be oriented differently from each other. Further, the exit zone may comprise a low-angle diffuser film, such as product ADF-0505 manufactured by FusionOptix of Woburn, Mass. The low-angle diffuser film may be included in order to couple out the light incident on display surface 12 at a grazing angle, so it is not imaged by imaging optic 20. More specifically, light from the LED array may be trapped by TIR in the illuminating light guide; weak diffusion by the low-angle diffuser film causes the ray angles to be scattered within the illuminating light guide. At each interaction, some light passes the TIR angle and escapes. Although the light may escape half from the top and half from the bottom, only the light escaping from the top is used to illuminate objects.

FIG. 2 shows infrared light ray 80, for example, entering illuminating light guide 74 through entry zone 76, being turned via a turning structure of the entry zone, and undergoing an internal reflection at a boundary of the illuminating light guide. The internal reflection is a consequence of the illustrated light ray intersecting the boundary at an angle greater than the Snell's Law critical angle. Continuing forward, the illustrated light ray interacts with the turning structure of exit zone 78, and is reflected substantially upward from the exit zone. At least some of the illustrated light ray is now transmitted through the boundary of the illuminating light guide, instead of being totally internally reflected; this is because the illustrated light ray now intersects the boundary at an angle less than the critical angle.

In the embodiment illustrated in FIG. 2, exit zone 78 of illuminating light guide 74 is planar and substantially parallel to touch-sensitive display surface 12. In this configuration, light projected from the exit zone passes through diffuser 24 and may illuminate object 40, which is in contact with the touch-sensitive display surface. It will be understood however, that numerous other illumination configurations are possible, and are equally consistent with the present disclosure.

Figure 11:
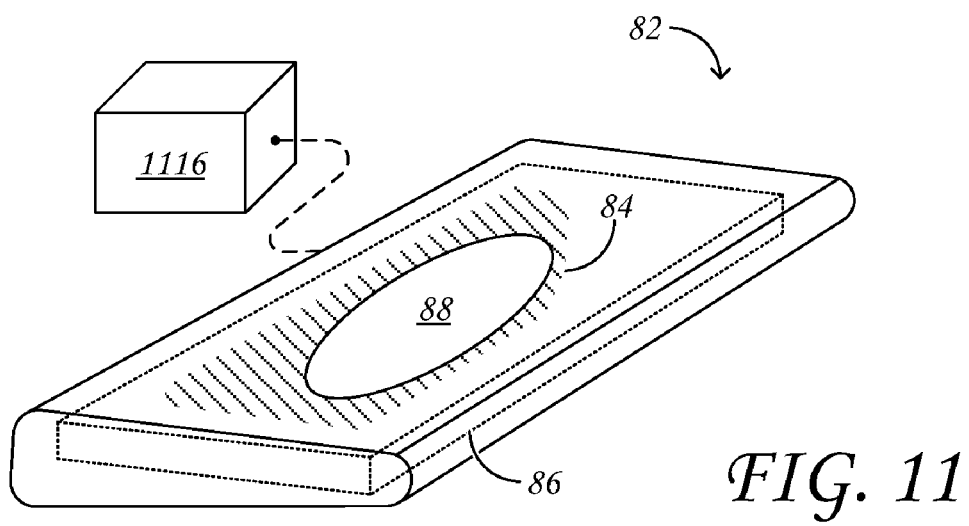
FIG. 11 shows aspects of an example input device in one embodiment in accordance with the present disclosure.

FIG. 11 shows aspects of an example input device 82 in one embodiment. The input device includes input zone 84, where user input is received. User input may be received via a touch-sensitive area of the input zone (a virtual keypad, mouse pad, or control pad, for example), and/or a mechanical keyboard. Optical system 86, located behind the input zone, may be configured to provide input and/or input-guiding functionality to the input zone. Accordingly, the optical system is operatively coupled to controller, indicated schematically at 1116. While FIG. 11 shows the controller outside of the input device (e.g., such that the input device is controlled by a computing device to which the input device is attached), it will be understood that the controller may be integrated into the input device in embodiments equally consistent with this disclosure. In one embodiment, the optical system may be configured to illuminate all or part of the input zone and to detect light reflected from objects placed on the input zone, substantially as described hereinabove with reference to touch-sensitive display surface 12. In other embodiments, however, the input functionality of the input zone may be enabled independent of the optical system—via a capacitive or resistive touch screen and/or mechanical key switches, for example.

In the embodiment shown in FIG. 11, input zone 84 includes image-adapted area 88. The image-adapted area is an area on which one or more changeable images—keyfaces, dials, slide-bar controls, etc.—may be displayed for the purpose of guiding user input. Accordingly, optical system 86 may be configured to display one or more changeable images on the image-adapted area, and thereby provide input-guiding functionality to the input zone. In other embodiments equally consistent with this disclosure, the image-adapted area may occupy multiple, non-overlapping regions of the input zone, or it may coincide with the entire input zone.

FIG. 12 is a schematic, cross-sectional view showing aspects of optical system 86 and input zone 84 in one embodiment. The optical system includes side-mounted light source 89, display optic 1220, and light valve 1222; the input zone includes partly transparent keyface 90 disposed within image-adapted area 88.

As in the previous embodiments, the light valve may be any image-forming, light-gating device—a liquid-crystal display device, for example. Side-mounted light source 89 may be any illuminant configured to provide suitably intense, divergent light over a suitably broad visible wavelength range. In the embodiment illustrated in FIG. 12, light from the side-mounted light source (light ray 91, for example) is projected through display optic 1220 and is modulated by numerous light-gating elements of light valve 1222 to provide a modulated image to image-adapted area 88, and specifically, to keyface 90.

Taken together, side-mounted light source 89 and light valve 1222 constitute an image-creating subsystem in one example embodiment. The image-creating subsystem may be adapted to create a changeable, visible image using light from a light source (side-mounted light source 89, for example) and to provide the changeable, visible image to keyface 90 or elsewhere within image-adapted area 88. Accordingly, the image-creating subsystem may be operatively coupled to controller 1116. Further, display optic 1220 may be configured to turn and project the light from the light source so that the visible image may be displayed on keyface 90, or elsewhere within the image-adapted area. In the embodiment shown in FIG. 12, display optic 1220 is configured to direct the visible light through the light valve and onto the image-adapted area.

In other embodiments equally consistent with this disclosure, image-creating subsystems of other configurations may be used instead. For example, a light valve may be incorporated into a side-mounted light source so that a fully formed image is projected through display optic 1220 and onto image-adapted area 88. In still other examples, the image may created via a laser operatively coupled to controller 1116 and configured to raster coherent, image-modulated light into the display optic.

In the embodiment illustrated in FIG. 12, it is assumed that input functionality is provided independent of optical system 86—via a capacitive or resistive touch screen and/or mechanical key switches, for example. Therefore, no detector or other input-receiving device is included in the drawing. However, in some embodiments fully consistent with this disclosure, the optical system may be further configured to provide input functionality as well, as described previously in the context of optical system 14.

To provide an image to image-adapted area 88, display optic 1220 may be configured to transmit light via total internal reflection and to turn at least some of the light towards the image-adapted area. Therefore, the display optic comprises wedge-shaped light guide 1227, having an upper face 1228 and a lower face 1230. Multilayer turning structure 1244 is disposed on the lower face. In the illustrated embodiment, the wedge-shaped light guide further includes a thicker side adjacent the upper and lower faces and supporting a reflective coating 92, and, a thinner side adjacent the upper and lower faces, opposite the thicker side. Coupled to a display optic of this configuration, the image-creating subsystem may be adapted to project light for forming the image into the thinner side of the wedge-shaped light guide.

FIG. 13 provides a more detailed view of multilayer turning structure 1244. In one embodiment, multilayer turning structure 1244 may be substantially the same as multilayer turning structure 44 described hereinabove, but numerous variations are contemplated as well. For example, in embodiments where transmission of light normal to the display optic is not an issue, dichroic coating 50 of the previous embodiment may be replaced by a broadband reflective coating. Accordingly, the embodiment illustrated in FIG. 13, shows broadband reflective coating 93 disposed on top of patterned layer 1348. In one embodiment, the broadband reflective coating may be a thin layer of aluminum. In another embodiment, it may be a thin film of silver disposed on top of an inconel sublayer. It will be understood that the examples provided herein are not intended to be limiting, as various other reflective coatings may be suitable as well. In contrast to the previous embodiments, multilayer turning structure 1244 is configured to interact strongly with light over a broad wavelength range that includes visible and infrared regions.

FIG. 14 shows light ray 91 entering display optic 1220 at an angle greater than the Snell's Law critical angle for the boundary between the wedge-shaped light guide 1227 and cladding layer 1356; the light ray is totally internally reflected. On reaching upper face 1228, the light ray is further reflected back to lower face 1230. As shown in FIG. 15, light ray 91 may now intersect the boundary between the wedge-shaped light guide and the cladding layer at less than the critical angle and be refracted out of the light guide. The light ray then reflects off broadband reflective coating 93, projects upward through the display optic, and forms an image on image-adapted area 88—and on keyface 90 in particular.

In order for any light reflected from side-mounted light source 89 to reach image-adapted area 88, it may exit wedge-shaped light guide 1227 via refraction. However, reflection will also occur at each boundary that the light ray intersects. Thus, FIG. 15 shows light ray 91 splitting into a refracted light ray 1560 and a reflected light ray 1562. Refracted light ray 1560 is further split into a forward light ray 1564 and an interfering ray 1566. In the embodiment illustrated in FIG. 15, the equivalent refractive indices of adhesive layer 1354 and wedge-shaped light guide 1227 may help to provide that the intensity of interfering light ray 1566 is nearly equal to that of reflected light ray 1562. Further, the phase angle separating the two rays is determined by the thickness of cladding layer 1356 and by the angle at which light ray 91 intersects the cladding layer. The thickness of the cladding layer may therefore be chosen, as previously described, to eliminate the reflected power and to maximize the forward power.

As in the case of the previous embodiment, the advantages of the present embodiment are best understood with reference to an otherwise similar configuration in which no cladding layer is disposed on the wedge-shaped light guide. Such a configuration would suffer an analogous, though optically converse, set of problems. First, residual internal reflection below the critical angle of incidence would cause a significant amount of light to remain in the wedge-shaped light guide, and thereby steal intensity from the exiting, forward light ray. As a result, the intensity of the image projected on image-adapted area 88 would be attenuated. Second, the attenuation would be sensitive to the polarization state of the incident light, resulting in variations in image intensity depending on geometric and materials properties of the optical system. Third, the residual internal reflection noted above would cause the light remaining in the light guide to go an extra bounce before exiting, thereby forming a ghost image superposed on the desired image.

By providing cladding layer 1356 on display optic 1220, the illustrated embodiment addresses each of the deficiencies identified above.

Figure 16:
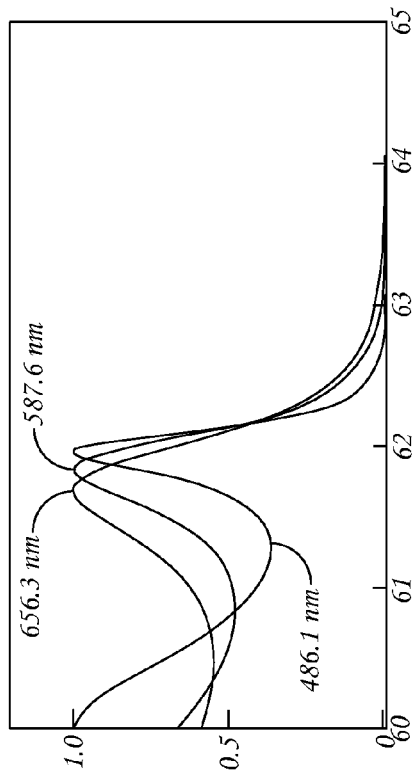
FIG. 16 shows graphs of transmission efficiency versus incidence angle for selected, interfaces in example embodiments in accordance with the present disclosure.

As shown in FIG. 10, both clad and unclad light guides exhibit total internal reflection of light incident on the light-guide boundary above a critical angle, and refract at least some light incident on the boundary below the critical angle. For a light guide having a thin-layer coating, however, the critical angle may depend on wavelength. In cases where the propagating light is confined to a narrow wavelength band—light from an IR-LED, for example—this issue may not pose a significant issue. However, in applications where a light guide is used to image broad-band light, a wavelength dependence on the critical angle may lead to various undesired effects, including color distortion and projection of superposed, false-color images. Fortunately, the cladding layers as disclosed herein are found to be suitably insensitive to wavelength, as shown in the transmission spectra of FIG. 16, where transmission efficiency is plotted on the vertical axis, and incidence angle is plotted on the horizontal for wavelengths in the visible.

In other embodiments, the thin-layer cladding approach as described hereinabove may be taken a step further. In a display optic comprising a wedge-shaped light guide having opposing upper and lower faces, a cladding layer may be disposed on the lower face, as described hereinabove, and on the upper face as well. A potential advantage of this embodiment is now described with reference to the ray diagram of FIG. 17.

Figure 17:
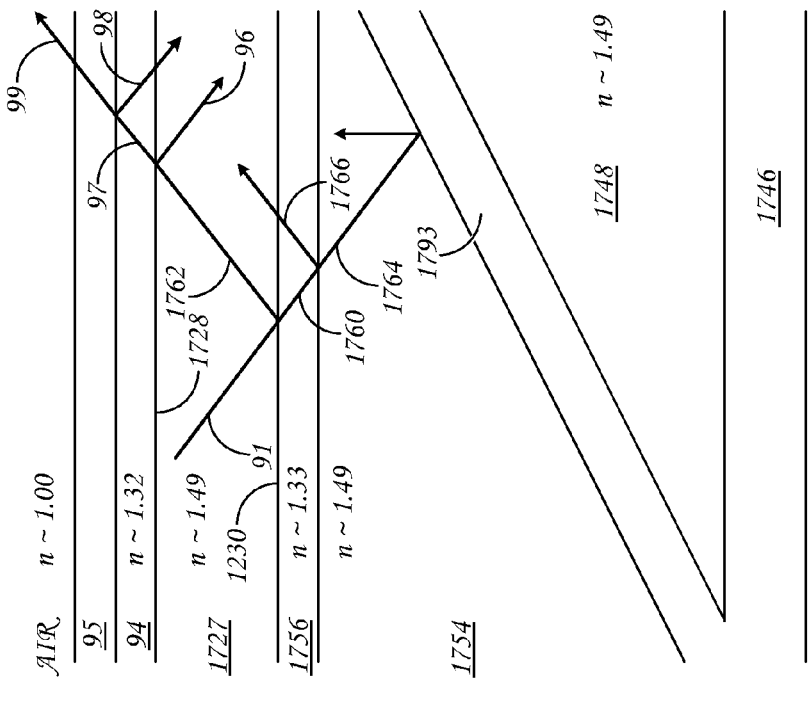
FIG. 17 shows a ray diagram in which light interacts with a display optic in accordance with one embodiment of the present disclosure.

The layered structure of the display optic shown in FIG. 17 is similar to the one shown in FIGS. 14 and 15, but further includes upper cladding layer 94 and capping layer 95. The appropriate composition and thickness of the upper cladding layer may be substantially the same as that of cladding layer 56, described hereinabove. However, the upper cladding layer may be chosen to have a refractive index lower than that of cladding layer 1756 of the presently described embodiment. The capping layer may comprise any suitably transparent material having a refractive index matched to that of wedge-shaped light guide 1727.

FIG. 17 shows light ray 91 intersecting the boundary between wedge-shaped light guide 1727 and cladding layer 1756 at less than the critical angle for the boundary. Most of the light is therefore refracted out of the light guide, where it reflects off broadband reflective coating 1793 and projects upward through the display optic to form an image.

As indicated above, reflection will also occur at each boundary that the light ray intersects. Thus, FIG. 17 shows light ray 91 splitting into a refracted light ray 1760 and a reflected light ray 1762. Refracted light ray 1760 is further split into a forward light ray 1764 and an interfering ray 1766. In the embodiment illustrated in FIG. 17, the equivalent refractive indices of adhesive layer 1754 and wedge-shaped light guide 1727 provide that the intensity of interfering light ray 1566 is nearly equal to that of reflected light ray 1562. Further, the phase angle separating the two rays is determined by the thickness of cladding layer 1756 and by the angle at which light ray 91 intersects the cladding layer. The thickness of the cladding layer may therefore be chosen, as described above, to attenuate the reflected power and to correspondingly increase the forward power.

As further indicated above, destructive interference between reflected light ray 1762 and interfering light ray 1766 may reduce the power of the reflected ray to a small fraction of the forward ray (10%, for example), but reflection at this level may still be problematic for some, select applications. Therefore, FIG. 17 shows reflected light ray 1762 incident on the boundary between wedge-shaped light guide 1727 and upper cladding layer 94. The reflected light ray now splits into returning light ray 96 and refracted light ray 97. Refracted light ray 97 further splits into escaping light ray 98 and interfering light ray 99. The equivalent refractive indices of capping layer 95 and wedge-shaped light guide 1727 may help to provide that the intensity of returning interfering light ray 97 is nearly equal to that of interfering returning light ray 99. Further, the phase angle separating the two rays is determined by the thickness of upper cladding layer 94 and by the angle at which light ray 91 intersects the upper cladding layer. The thickness of the upper cladding layer may therefore be chosen, as described above, to eliminate the returning power and to maximize the escaping power. Accordingly, this embodiment provides not one but two stages of destructive interference, the effect of which is to further reduce the intensity of ghost images projected through the display optic.

FIG. 18 illustrates an example method 100 for making an imaging or display optic in one embodiment. The method begins at 102, where a wedge-shaped light guide having opposing upper and lower faces is formed. The wedge-shaped light guide may be formed in any suitable manner. One example method 104 for forming the wedge-shaped light guide is illustrated in FIG. 19.

Method 104 begins at 106, where a molten, thermoplastic polymer or other thermoplastic material is forced through an extrusion die having a quadrilateral or other suitable cross section. The thermoplastic polymer may comprise a poly-acrylate, a polyacrylonitrile, a polyamide, and/or a polycarbonate, for example. The thermoplastic material may be selected for transparency in one or more visible, ultraviolet, and/or infrared wavelength ranges. In embodiments where the light guide is to be used solely for displaying and/or collecting optical images, transparency over the visible range may be sufficient. In other embodiments, however, the thermoplastic polymer may be selected for transparency in various infrared and/or ultraviolet ranges as well. Further, the thermoplastic material may be chosen in view of its refractive index. In some embodiments, the thermoplastic material, in solid form, may have a refractive index greater than 1.4.

Forcing the molten thermoplastic polymer through a die having a quadrilateral cross-section gives rise to a substantially wedge-shaped extrusion having a pair of opposing faces and a quadrilateral cross-section. In other embodiments, the die may be shaped differently, thereby providing a differently shaped extrusion. For example, the extrusion die may be rectangular in shape and give rise to a sheet-like (i.e., rectangular prismatic) extrusion.

Continuing in FIG. 19, method 104 advances to 108, where the cooled extrusion is cut to one or more fixed dimensions, including but not limited to a fixed width. The extrusion may be cut by using a saw or a mill. The dimensions to which the extrusion is cut may be chosen based on the dimensions of the display device in which the light guide is to be installed.

Method 104 advances to 110, where the cut extrusion is refined to an appropriate shape and to appropriate dimensions for further processing. In some embodiments, the appropriate shape may be similar to the final shape of the light guide that is desired, and the appropriate dimensions may be the same as or slightly larger than the desired final dimensions. Refining the extrusion may comprise machining, cutting, milling, etching, and/or polishing, as examples. Etching may comprise wet or dry mechanical etching (e.g., sanding or filing) and/or chemical etching. Any etching process may be conducted with the aid of a mask (e.g., a photomask) to vary the etching depth in a controllable manner, to introduce surface features, etc.

Refining the extrusion at 110 may also comprise modifying a cross-section of the extrusion. Thus, in some embodiments, process step 106 may result in an extrusion having the desired wedge shape, while in other embodiments, the extrusion may have a rectangular, sheet-like shape before refinement, and at 110, be refined to have the desired wedge shape.

In order for the wedge-shaped light guide to transmit images with high fidelity and without undue loss, the opposing faces may be configured to be flat and smooth. In some embodiments, the methods described hereinabove may yield surfaces having adequate smoothness. In other embodiments, however, refinement at 110 may further comprise finely adjusting the dimensions of the wedge-shaped light guide until the desired planarity and smoothness is achieved. The dimensions may be finely adjusted via mechanical etching or polishing, as described above, via compression molding, or in any other suitable manner.

Returning now to FIG. 18, method 100 advances to 112, where a thin cladding layer is applied to at least a first face of the wedge-shaped light guide. The thin cladding layer applied according to this method may have substantially the same properties as described for cladding layers 56, 1356, and/or 1756 of the embodiments described hereinabove. It will be understood, however, that the cladding layer applied according to this method may also be at least partly different. Thus, the cladding layer may have a refractive index less than that of the wedge-shaped light guide. The refractive index may be less than 1.4, for example. Further, the thickness of the cladding layer may be selected based on the wavelength range of the light to be imaged and/or displayed as described hereinabove with reference to equation 1 and the description following equation 1.

In some embodiments, applying the cladding layer to at least the first face of the wedge-shaped light guide may comprise applying a liquid or gel-like cladding formulation to at least the first face and allowing at least some of the liquid or gel-like cladding formulation to solidify. The liquid or gel-like cladding formulation may be chosen to have, after curing, a refractive index lower than that of the wedge-shaped light guide. For example, the liquid or gel-like cladding formulation may comprise a fluoropolymer dispersion or pre-polymerized fluoropolymer precursor. Allowing at least some of the liquid or gel-like cladding formulation to solidify may comprise promoting a curing process—thermally or photochemically—as further described below. In embodiments where a polymer precursor such as a fluoropolymer precursor is included in the cladding formulation, the solidification may comprise a polymerization or oligomerization process.

In some embodiments, the liquid or gel-like cladding formulation may comprise a 100-percent-solids formulation; in other embodiments, the formulation may comprise a solvent or other vehicle to aid in dispersing the cladding material or precursor.

In these and other embodiments, the liquid or gel-like cladding formulation may include an ultraviolet-curable component. Accordingly, method 100 may further comprise irradiating at least the first face of the wedge-shaped light guide with ultraviolet radiation to cure the ultraviolet-curable component.

Depending on the particular liquid or gel-like cladding formulation in use, various different modes of application may be used. In one embodiment, the formulation may be sprayed onto at least the first face of the wedge-shaped light guide in the form of an aerosol. In one variant of this approach, the liquid or gel-like cladding formulation may be dispersed ultrasonically during the spraying process.

Figure 20:
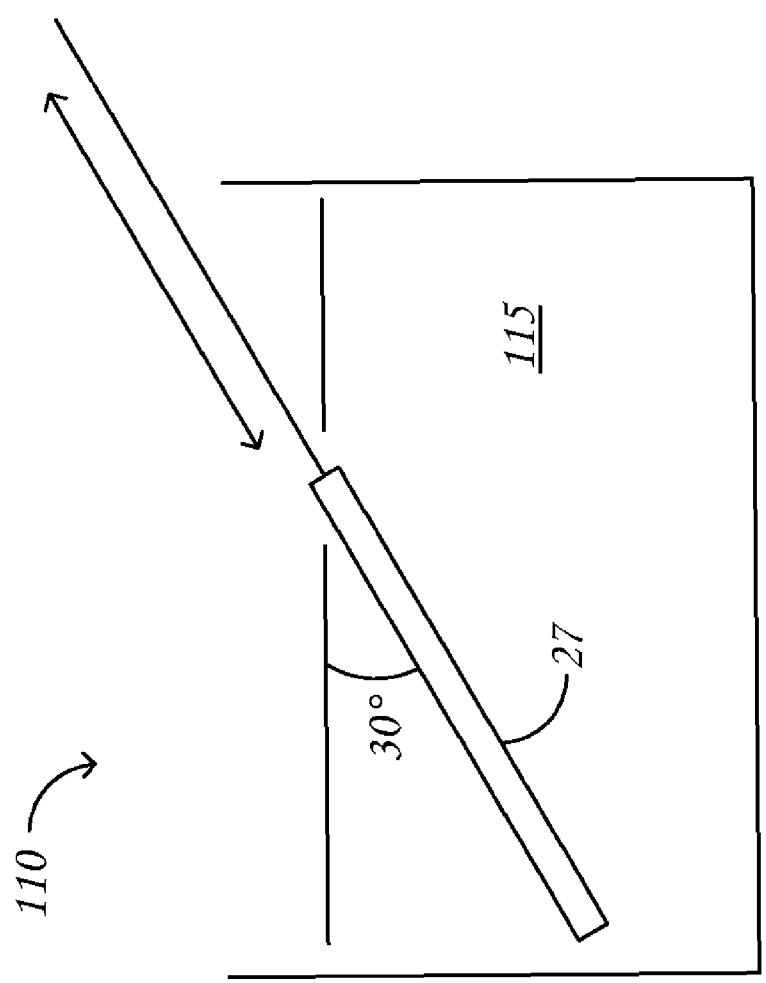
FIG. 20 shows an example application system to enable a cladding to be applied to a wedge-shaped light guide in accordance with one embodiment of the present disclosure.

In another embodiment, applying the liquid or gel-like cladding formulation may comprise at least partly immersing the wedge-shaped light guide in the liquid cladding formulation, and, in some variants, withdrawing the wedge-shaped light guide from the liquid cladding formulation at an oblique angle with respect to a surface of the liquid cladding formulation. FIG. 20 shows an example application system 113 to enable a cladding to be applied to a wedge-shaped light guide 27 via immersion in, followed by withdrawal from, a liquid cladding formulation 115. In one embodiment, the application system shown in the drawing may be used with a liquid cladding formulation comprising a 2.5 percent solution of MY-133MC (a product of MY Polymers), dissolved in a suitable solvent. Suitable solvents include parachlorobenzotrifluoride (PCBTF), HFE-7100 (a product of 3M Corporation of Saint Paul, Minn.), and Oxol-100 (a product of Halliburton Corporation of Houston, Tex.), for example.

After immersion in the cladding formulation, the wedge-shaped light guide may be withdrawn at an oblique angle with respect to the surface of the liquid cladding formulation—30 degrees, for example—using a controlled-velocity, motorized lift. In this embodiment, the curing of the cladding layer may occur following, or at least partly during, the withdrawal process. In some embodiments, immersion, withdrawal, and curing may each be enacted once to provide a cladding layer of the desired thickness. In other embodiments, repeated immersion and curing may be used to attain the desired thickness.

In yet another embodiment, applying the liquid or gel-like cladding formulation may comprise applying the formulation to the first face of the wedge-shaped light guide in a fixed-thickness layer by dragging a doctor blade along and at a fixed distance above the first face.

Method 100 then advances to 114, where a turning film is adhered to the cladding layer via an interface layer. The turning film may comprise a prismatic patterned film to which broadband or dichroic reflective coating is applied, as described above. Applying the turning film via the interface layer may comprise applying an adhesive layer to one or both of the cladding layer and the turning film. The adhesive may be chosen such that the refractive index of the cured adhesive layer (i.e., the interface layer) is matched to that of the wedge-shaped light guide. The turning film may then be compressed against the cladding layer. In some embodiments, the adhesive may be a thermally curing resin—an epoxy/amine resin, for example. In other embodiments, the adhesive may be air- or moisture-curing. In still other embodiments, the adhesive may be ultraviolet-curing. It may comprise an ultraviolet-curing, acrylic resin, for example. Accordingly, method 100 may further comprise irradiating at least the first face of the optic with ultraviolet light to cure the adhesive layer.

Method 100 then advances to 116, where any unwanted cladding layer is removed from the wedge-shaped light guide. The unwanted cladding layer may be removed by chemical or mechanical etching, for example, by adhering a sticky film to the cladding layer and then lifting it off, or in any other suitable manner.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. An optic comprising:
    a wedge-shaped light guide having opposing first and second faces and comprising a material having a first refractive index, the first face supporting a cladding layer having a second refractive index less than the first refractive index; and
    a turning film bonded to the cladding layer via an interface layer, the interface layer presenting a third refractive index extending from the cladding layer to the turning film, the third refractive index matched to the first refractive index, wherein the optic is configured to attenuate a reflection of light having a median wavelength $\lambda$ and wherein the thickness d of the cladding layer is given by $$d \approx \frac{M\lambda}{2n_2\sqrt{1-(n_2/n_1)^2}},$$

where $n_1$ is the refractive index of the wedge-shaped light guide, $n_2$ is the refractive index of the cladding layer and M is an odd integer.

2. The optic of claim 1, wherein the cladding layer is a first cladding layer, and wherein the second face supports a second cladding layer bonded to the second face and having a fourth refractive index less than the second refractive index.

3. The optic of claim 1 configured to transmit light laterally between the opposing first and second faces at least partly via total internal reflection from a boundary of the cladding layer.

4. The optic of claim 1, wherein the interface layer comprises an adhesive.

5. The optic of claim 4, wherein the adhesive comprises a polyacrylic adhesive.

6. The optic of claim 4, wherein the adhesive comprises an ultravioletcurable adhesive.

7. The optic of claim 1, wherein the cladding layer comprises a fluoropolymer.

8. The optic of claim 1, wherein the light whose reflection is attenuated is incident on a boundary of the cladding layer at an angle less than a Snell's Law critical angle for the boundary, the angle measured normal to the boundary.

9. The optic of claim 1, wherein the turning film comprises a plurality of facets oblique to the first face of the wedge-shaped light guide and supporting a reflective coating.

10. The optic of claim 1, wherein the cladding layer comprises a moth-eye structure.

11. The optic of claim 1, wherein the cladding layer comprises a silicone polymer.

12. A touch-sensitive display system configured to detect touch by capturing an image of one or more objects disposed on a touch-sensitive display surface, the system comprising:
    an illuminant configured to illuminate the one or more objects from behind the touch-sensitive display surface with light having a median wavelength $\lambda$;
    a detector configured to capture the image;
    an optic configured to direct to the detector light reflected from the one or more objects and to attenuate a reflection of the light, the optic comprising:
        a wedge-shaped light guide having opposing first and second faces and comprising a material having a first refractive index, the first face supporting a cladding layer having a second refractive index less than the first refractive index, a thickness d of the cladding layer given by $$d \approx \frac{M\lambda}{2n_2\sqrt{1-(n_2/n_1)^2}},$$

where $n_1$ is the refractive index of the wedge-shaped light guide, $n_2$ is the refractive index of the cladding layer, and M is an odd integer; and
        a turning film bonded to the cladding layer via an interface layer, the interface layer presenting a third refractive index extending from the cladding layer to the turning film, the third refractive index matched to the first refractive index.

13. The touch-sensitive display system of claim 12, wherein the illuminant comprises an infrared light-emitting diode, and the detector comprises an infrared-sensitive camera.

14. The touch-sensitive display system of claim 12, wherein the turning film comprises a plurality of facets oblique to the first face of the wedge-shaped light guide and supporting a reflective coating.

15. A system for displaying a visible image on a surface, the system comprising:
- an image-creating subsystem adapted to create the visible image from light from a light source; and
- an optic configured to turn and project the light to display the visible image on the surface, the optic comprising:
  - a wedge-shaped light guide having opposing first and second faces and comprising a material having a first refractive index, the first face supporting a first cladding layer having a second refractive index less than the first refractive index, the second face supporting a second cladding layer having a fourth refractive index less than the first refractive index and nearer to the second refractive index than to the first refractive index; and
  - a turning film bonded to the cladding layer via an interface layer, the interface layer having a third refractive index matched to the first refractive index, wherein the optic is configured to attenuate a reflection of light having a median wavelength λ and wherein the thickness d of one or more of the first and the second cladding layers is given by $$d \approx \frac{M\lambda}{2n_2\sqrt{1-(n_2/n_1)^2}},$$

where $n_1$ is the refractive index of the wedge-shaped light guide, $n_2$ is the refractive index of the cladding layer and M is an odd integer.

16. The system of claim 7, wherein the wedge-shaped light guide includes:
- adjacent to the first and second faces, a thicker side supporting a reflective coating; and
- adjacent to the first and second faces, a thinner side opposite the thicker side, wherein the image-creating subsystem is configured to project the image into the thinner side.

17. The system of claim 7, wherein the light source is configured to direct visible light through an image-forming light valve and into the optic.

18. The system of claim 7, wherein the light source is configured to direct visible light into the optic, and wherein the optic is configured to turn the visible light and direct the visible light through an image-forming light valve and toward the surface.

19. The system of claim 7, wherein the light source comprises a laser configured to raster coherent, image-modulated light into the optic.

* * * * *